Patented Dec. 17, 1929

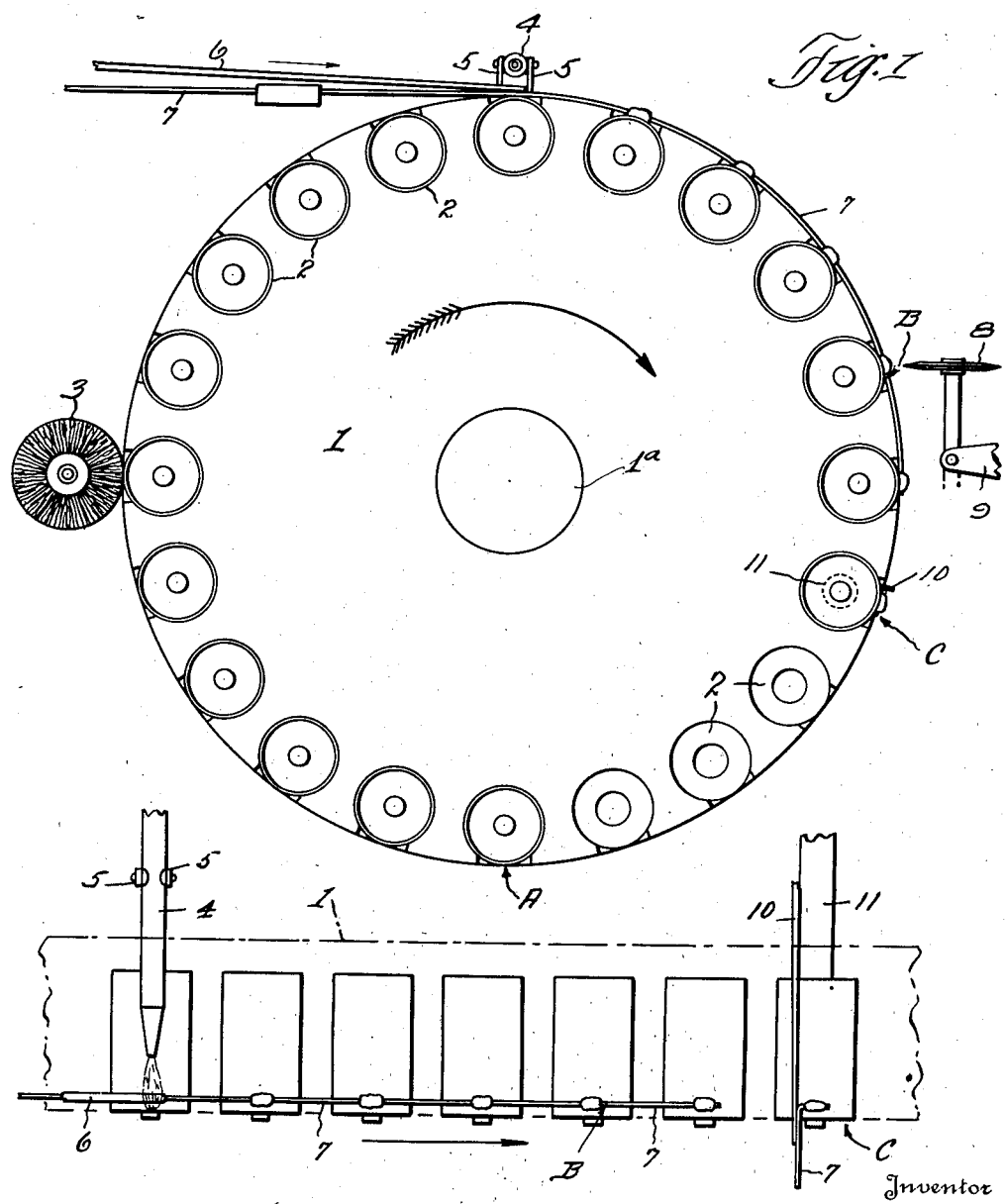

1,739,506

UNITED STATES PATENT OFFICE

CYRIL P. DEIBEL, OF LAKEWOOD, OHIO, ASSIGNOR TO GENERAL DRY BATTERIES, INCORPORATED, OF CLEVELAND, OHIO, A CORPORATION OF OHIO

PROCESS AND APPARATUS FOR FORMING CONNECTERS FOR DRY CELLS

Application filed May 19, 1927. Serial No. 192,580.

This invention relates to a process and equipment for soldering connecting wires to the zinc electrodes or cans of dry cells.

The main object of the invention is to provide a process and apparatus for soldering the connecting wires to the sides of zinc cans used in the well-known B batteries although the invention is not to be limited to the details of any particular machine or to any particular size or type of dry cell.

Another object of the invention is to provide a process for soldering connecters to dry cell cans which is particularly well adapted for use with automatic machines.

Another object of the invention is to provide a process for soldering connecters to dry cell cans which permits of accurate and easy soldering work and in which the connecter is firmly held during the entire period during which the solder is in the fluid or semi-plastic condition whereby no defective joints are obtained such as occur when the conductor is not held until the solder has completely solidified.

A still further object of the invention is to provide a process for soldering connecters to dry cell cans in which a continuous metallic conductor is secured to a plurality of cans which have been previously spaced apart a predetermined distance and in which the conductor is severed between the cans after a tight soldering or welding has been effected.

Further and more limited objects of the invention will appear as the description proceeds and by reference to the accompanying drawing in which Fig. 1 is a view in front elevation illustrating the preferred embodiment of my invention and Fig. 2 is a somewhat diagrammatic top plan view of the apparatus shown in Fig. 1.

In the manufacture of radio B batteries, it is common practice to solder a short piece of wire to the zinc can of each individual cell. When the cells are later assembled into the usual fifteen or thirty cell batteries, the free end of each wire is soldered to the brass capped carbon electrode of the adjacent cell. These wires thus serve as conducting connecters between adjacent cells, so that fifteen or thirty individual cells each having a voltage of 1½ volts are connected in series to produce a battery having a voltage of 22½ or 45 volts.

It has been common practice to solder one wire on one dry cell can at a time by hand, using the usual gas or electrically heated soldering iron.

In order to obtain the economies of automatic machinery as well as to do uniform work of much better quality I have devised the following process and equipment which will be hereinafter more fully described.

My process consists essentially in soldering or welding a continuous metallic conductor to two or more dry cells of the zinc container type, which cells have been previously spaced apart a pre-determined distance, and then cutting the conductor between the cells after a tight soldering or welding bond has been effected.

Referring now to the drawing, the reference character 1 designates a drum which is non-rotatably mounted on a shaft 1ª which serves as a means for revolving the drum. The drum 1 is provided with a plurality of outwardly opening recesses 2 therein disposed about its periphery and spaced apart as shown most clearly in Fig. 1. The drum 1 is intermittently rotated by any suitable driving mechanism. Positioned adjacent the periphery of the drum is a rotary brush 3 which is adapted to project a short distance into the recesses 2 in such a manner that when the drum is rotated and the cans are inserted into the recesses 2, the brush will engage the side walls of the can and polish or burnish the same when the can is moved opposite to the brush. The brush may be driven by any suitable mechanism. Also positioned adjacent the periphery of the drum 3 is a burner 4 which is pivotally supported on trunnions 5. The burner 4 is connected with a suitable source of gas supply, preferably natural gas, although an oxygen flame or acetylene or hydrogen together with oxygen or compressed air may be used. The burner 4 is pivotally mounted as hereinbefore described and is adapted to be tipped downwardly by any suitable mechanism in timed relation to the movement of the drum. The flame from the burner is a very small jet under pressure and so arranged that it is automatically lowered into position for supplying heat for the soldering operation and is then raised out of position until the next can has been moved into the soldering position. A gas flame is much superior to a soldering iron as it can be kept uniform and there is no necessity for shutdowns in order to clean or change the soldering coppers. Furthermore, the work is greatly superior, as practically all soldering joints are perfect and in case the joints are not perfect they are not soldered at all. In other words, the work is either distinctly good or bad, whereas with a soldering iron there is a wide range of soldering which would come under a poor or questionable class. This is a very important feature because a 90 volt B battery contains 120 soldered joints and a single poorly soldered joint may cause the whole battery to be defective or fail to give satisfactory service.

The solder is preferably in the form of wire 6 which is fed forward by an automatic intermittent feed so that just enough solder is moved in position above the conductor 7 and opposite the flame so that when the flame is depressed the soldering operation is performed. With the close uniform regulation I am able to obtain large savings in the amounts of solder used, as compared with soldering iron work. Furthermore, with my process, I can make additional savings by using a 40% tin solder whereas with soldering irons the more expensive 50% tin solder must be used for efficient work.

The wire conductor or connecter 7 is moved forward from a reel intermittently by the drum 1 so that the wire is approximately at right angles to the vertical axis of the can to which it is to be soldered. The wire 7 is preferably passed through a bath of flux before it reaches the soldering position or if desired the solder may be passed through a bath of flux before it reaches the flame. Also positioned adjacent the periphery of the drum 1 is a cutter 8 which is pivotally mounted on a suitable support as shown at 9, the purpose of which is to sever the conductor or connecter adjacent the point where it is attached to each can. Attention is called to the fact that the cutter is located at a substantial distance from the flame so as to allow the solder to harden and set or solidify before the cutting operation is performed. Positioned adjacent the cutter 8 is a plunger 10 which is disposed parallel to the axis of the cans and is intermittently actuated to bend up the free ends of the connecter as shown most clearly in Fig. 2.

The cans containing the mix and the carbon electrode are fed into the rotary drum 1 at the point A in Fig. 1 and the drum is intermittently rotated to bring each can in succession opposite to the brush 3 where the can is brushed for the purpose of removing dirt or scale which may have adhered to the side wall of the can. The step by step movement of the drum moves the cans successively opposite to the flame and when the burner is depressed the conductor 7 will be soldered to each can in succession.

After the connecter has been soldered to the first can the continued movement of the drum winds the connecter against the side wall of each succeeding can and the timing of the drum is such that it remains at rest sufficiently long to permit the flame to be depressed to effect the soldering operation. The strip of solder is fed forward in synchronism with the movement of the drum so that a sufficient quantity of solder is moved opposite the flame at the proper time. The continued movement of the drum finally moves the soldered can opposite to the cutter 8 whereupon the cutter is actuated to sever the conductor at the point B, the drum being at rest sufficiently long to permit this operation to be completed. The can is then moved to the position C where the plunger 10 is actuated to bend up the free end of the connecter. At this point, and after the bending up operation is completed, a second plunger or ejector 11 is actuated to discharge the can from the drum. The above described operation is repeated indefinitely.

According to the preferred embodiment of my invention the drum 1 is vertically disposed but the same may be positioned horizontally if desired. The accompanying drawing is substantially a diagrammatic illustration of one method of carrying out my process and it is understood that various changes may be made in the mechanical details.

It will now be clear that the connecter is soldered to the forward can of the row of cans and that the continued movement of the drum winds the conductor against the side wall of the other cans in succession. It will also be noted that a sufficient time will elapse between the soldering and cutting operations to allow the solder to solidify and effect a tight bond with the cans. It is necessary to manually feed the connecter forward for the first few soldering operations or until the solder has had time to harden as the connecter is maintained under a slight tension and will pull loose unless the solder is allowed to set.

While the mechanism for moving the cans has been described and shown as a rotary drum, I may make use of a horizontal conveyor or table in which case the wire may be fed either at right angles or parallel to the axis of the cans.

It will now be clear that I have provided a process for soldering connecters to dry cell cans which accomplishes the objects of the invention as hereinbefore stated. Various changes may be made in the specific details of my apparatus and process without departing from the spirit of my invention and I wish my invention to be limited only in accordance with the scope of the appended claims.

Having thus described my invention, what I claim is:—

1. The process of forming connecters for dry cell cans which consists in attaching a single conductor to the side walls of a plurality of cans, severing the conductor between the points of connection with each can and bending up the free ends so obtained.

2. The process of forming conductors for dry cells which consists in arranging a plurality of cells at spaced intervals, soldering a conductor to two or more of said cans, allowing the solder to solidify, severing the conductor between adjacent cans and bending up the free ends of the conductor.

3. The process of forming conductors for dry cell cans which consists in soldering a conductor to two or more cans which have been previously spaced apart a predetermined distance, allowing the solder to solidify, severing the conductor adjacent its connection with each can and bending up the free ends so obtained.

4. The process of attaching a conductor to dry cell cans which consists in arranging a plurality of cans at spaced intervals, intermittently moving said cans, attaching a conductor to a plurality of said cans, severing the conductor between the points of connection with each can and bending up the free ends so obtained.

5. The process of forming connecters for dry cell cans which consists in arranging a plurality of cans in spaced relation and intermittently moving the same, polishing a portion of the side wall of each can, soldering a single conductor to the polished portion of each can, severing the conductor adjacent each polished portion and bending up the free ends so obtained.

6. The process of forming connecters for dry cell cans which consists in arranging a plurality of cans in spaced relation, attaching a conductor to one of said cans, moving the cans to wind the conductor against certain other cans, securing the conductor to each can in succession and severing the conductor between the points of connection with each can.

7. The process of forming connecters for dry cell cans which consists in winding a conductor against a plurality of cans, soldering the conductor to each of said cans successively, allowing the solder to solidify, severing the conductor between the points of connection with each can and bending up the free ends so obtained.

8. The process of forming connecters for dry cell cans which consists in arranging a plurality of cans in a row in spaced relation, securing a conductor to the forward can of the row, moving the row of cans to wind said conductor against the other cans, securing said conductor to the side wall of each can successively, severing the conductor between the points of connection with each can and bending up the free ends so obtained.

9. The process of providing connecters for dry cell cans which consists in arranging a plurality of cans about a drum in spaced relation, securing a conductor to the forward can, moving said drum to wind said conductor against the other cans, securing said conductor to each of the cans successively, severing the conductor adjacent the point of connection with each can, bending up the free ends so obtained and ejecting said cans from the drum successively.

10. The process of forming connecters for dry cell cans which consists in arranging a plurality of cans in a row, soldering a conductor to the side wall of the forward can, moving the row of cans to move said conductor against the other cans, securing said conductor to the side wall of each can successively, severing the conductor adjacent the connection with each can and bending up the free ends so obtained.

11. The process of forming connecters for dry cell cans which consists in arranging a plurality of cans in a row attaching a conductor to the forward can, moving the row of cans intermittently to move the conductor against other cans, securing said conductor to each of said cans successively, severing the conductor between the points of connection with each can, and ejecting the cans from the row.

12. The process of providing connecters for dry cell cans which consists in arranging a plurality of cans in a row, attaching a conductor to the forward can, intermittently moving said row to move said conductor against the side wall of other cans, moving a strip of solder and a gas flame in juxtaposition to said conductor and the side wall of each can successively whereby to solder said conductor to each can in succession, severing the conductor between the points of connection with each can and bending up the free ends so obtained.

13. The process of forming connecters for dry cell cans which consists in arranging a plurality of cans in a row, attaching a conductor to the forward can, moving the row of cans to wind said conductor against the side walls of the other cans, moving a quantity of solder and a flame in juxtaposition to said conductor and the side wall of each can successively whereby to solder said conductor to each of said cans, severing the conductor adjacent its point of connection with the side wall of each can, and bending up the free ends so obtained.

14. The process of forming connecters for dry cells and securing the same thereto which consists in attaching the corresponding electrodes of a plurality of dry cells to a single electrical conductor, severing the conductor between the points of connection with each cell and bending up the free ends so obtained so as to provide a connecter for each cell.

15. In an apparatus for forming connecters for dry cells, the combination of a turret adapted to receive a plurality of dry cell cans therein, means for intermittently moving said turret, means for soldering a single conductor to a plurality of said cans in succession, means for severing the conductor adjacent the point of connection with each can after the solder has set, means for bending up the free ends of the conductors so severed and means for removing the cans from the turret.

16. In an apparatus for forming connecters for dry cells, the combination of a drum having recesses disposed about its periphery and adapted to receive dry cell cans therein respectively, means for moving said drum and means for soldering a single conductor to each of said cans successively, means for severing the conductor adjacent its point of connection with each can after the solder has hardened and means for bending up the free ends of the conductors so formed.

17. In an apparatus for forming connecters for dry cells, the combination of a conveyor adapted to receive a plurality of dry cell cans thereon, means for soldering a single conductor to a plurality of said cans in succession including means for moving said conveyor, means for severing the conductor adjacent its point of connection with each can whereby to provide a connecter for each can, the severing operation being performed after the solder has set, means for bending up the free ends of the connecters so provided and means for removing the cans from the conveyor.

18. In a soldering machine of the character described, the combination of a movable carrier adapted to contain a plurality of bodies, heating means arranged for successive engagement with said bodies as the latter are advanced by said carrier, said heating means being maintained at soldering temperature, means for supplying solder to said heating means, means for moving a wire across said bodies between the latter and said heating means whereby said wire is soldered to each of said bodies in succession, and cutting mechanism operating to sever the wire between each of said bodies following the soldering operation.

In testimony whereof, I hereunto affix my signature.

CYRIL P. DEIBEL.